United States Patent
Chiu (10) Patent No.: US 7,251,456 B2
(45) Date of Patent: Jul. 31, 2007

(54) WIRELESS MODULE SIMULATOR

(75) Inventor: Sammy Peter Chiu, Roseville, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 489 days.

(21) Appl. No.: 10/885,312

(22) Filed: Jul. 7, 2004

(65) Prior Publication Data

US 2006/0009157 A1    Jan. 12, 2006

(51) Int. Cl.
*H04B 17/00*    (2006.01)

(52) U.S. Cl. .................. 455/67.11; 455/67.12; 455/67.13; 455/67.14

(58) Field of Classification Search ............. 455/67.11, 455/67.14, 114.2, 423, 67.12, 67.13, 67.15, 455/67.16

See application file for complete search history.

(56) References Cited

U.S. PATENT DOCUMENTS

| | | | |
|---|---|---|---|
| 5,737,708 A * | 4/1998 | Grob et al. | 455/557 |
| 6,351,455 B1 * | 2/2002 | Thayer et al. | 370/241 |
| 7,054,781 B2 * | 5/2006 | Kolu et al. | 702/122 |
| 7,075,893 B1 * | 7/2006 | Mlinarsky et al. | 370/241 |
| 2003/0069010 A1 * | 4/2003 | Eravelli | 455/423 |
| 2003/0148761 A1 * | 8/2003 | Gaal | 455/423 |
| 2004/0248623 A1 * | 12/2004 | Nelson et al. | 455/569.1 |

* cited by examiner

*Primary Examiner*—Matthew Anderson
*Assistant Examiner*—Tuan Pham (57) ABSTRACT

Allowing a wireless network application to execute, as during development and testing, as if connected to a wireless network using wireless modems without requiring physical access to or presence of a wireless network or devices for accessing the same, by simulating a wireless modem or device. The simulation of commands for a type of wireless communication device with a predefined attention command set may entail receiving, at a wireless communication device simulator, attention commands of the attention command set. For received attention commands, responses may be automatically determined or selected in response to receiving the command without using a wireless communication device to determine the appropriate response. And, the determined attention command responses may be provided from the wireless communication device simulator.

16 Claims, 8 Drawing Sheets

RELATED ART

```
                        # Format of each line is:
# <command>, <response>, <delay> [, <hash key>, <new value>]*
#    <command> is the part of the AT command after the "AT" and before
#        and "=",
#    <response> is how the emulator should respond when issues the AT
command
#    <delay> is the delay of the response in seconds
#    <hash key> is an entry in the hash table (the <command> entries
are entries
#        in the hash table).
#    <new value> is the new value in the has table (potentially the new
response
#        for some command.
# ATD commands are treated as a special case in the base code
"+COPS", "OK", "1","+COPS?", "+COPS: ${VALUE}\\nOK"
"+CEER", "+CEER: 0,0,0", "1",
"+CFUN", "OK", "1",
"+CGACT", "OK", "1",
"+CGATT", "OK", "1",
"+CGDATA", "CONNECT", "1",
"+CGDCONT", "OK", "1",
"+CGQREQ", "OK", "1",
"+CMEE", "OK", "1",
"+CMGL", "OK", "1",
"+COPS", "OK", "1", "+COPS?", "+COPS: ${VALUE}\\nOK"
"+CPIN?", "+CPIN: SIM PIN\\nOK","1",
"+CPIN", "OK", "1",
"+CRC", "OK", "1",
"+CREG?", "+CREG: 2,1\\nOK\\n+CREG: 5,\"272B\",\"075B\"", "1",
"+CREG", "OK", "1",
"+CSQ", "+CSQ: 23,99\\nOK", "1",
"+FCLASS", "OK", "1",
"+VTD", "OK", "1",
"^SMSO", "OK", "1",
"E0V1H","OK", "1",
```

Table: cgatt

| Field | Type | Null | Key | Default | Extra |
|---|---|---|---|---|---|
| id | int(1) | YES | | NULL | |
| response | varchar(50) | YES | | NULL | |
| def | char(1) | YES | | NULL | |
| curr | char(1) | YES | | NULL | |
| delay | int(1) | YES | | NULL | |

160

Table: cops

| Field | Type | Null | Key | Default | Extra |
|---|---|---|---|---|---|
| id | int(1) | YES | | NULL | |
| response | varchar(50) | YES | | NULL | |
| def | char(1) | YES | | NULL | |
| curr | char(1) | YES | | NULL | |
| delay | int(1) | YES | | NULL | |

WIRELESS MODULE SIMULATOR

BACKGROUND OF THE INVENTION

In the field of testing and managing wireless services, and in particular testing and developing software therefor, it has been required to provide access to a wireless network. Such access requires the deployment and use of wireless access devices such as wireless modems. However, this presents problems when developing and testing software such as network testing and management software. One problem has been that the use of a wireless network or service provided by a commercial service provider is expensive and the behavior of the network or devices for connecting thereto is generally nondeterministic. That is, it is difficult to predict a wireless response at any given time. However, development and testing often requires deterministic control of test conditions. Furthermore, some conditions or network device responses may not be ordinarily available, for example, rare or unusual error conditions. This makes testing of a program's response to such conditions difficult.

Another problem has been that wireless services may not be readily available when development and testing software for the same. For example, some services may only be physically available in Europe or other geographic regions. This can make it difficult to develop and test software for these networks or services from distant locations or regions such as the United States. It may be necessary to deploy hardware or personnel at remote locations to facilitate testing and development. A wireless network service may be in the process of being deployed, making it difficult to develop and test software for use with the same. Furthermore, the cost of network access devices such as wireless modems makes it prohibitively expensive to test and develop software for conditions where a large number of network access devices are available.

There is a need to enable testing and development of software that uses a wireless network or service without requiring physical access to the wireless network and without requiring actual communication with wireless modems. There is also a need to allow software developers to control test conditions of wireless modems. There is also a need to test network applications under the condition of large numbers of network access devices such as wireless modems.

DETAILED DESCRIPTION OF THE PREFERRED EMBODIMENTS

Figure 1:
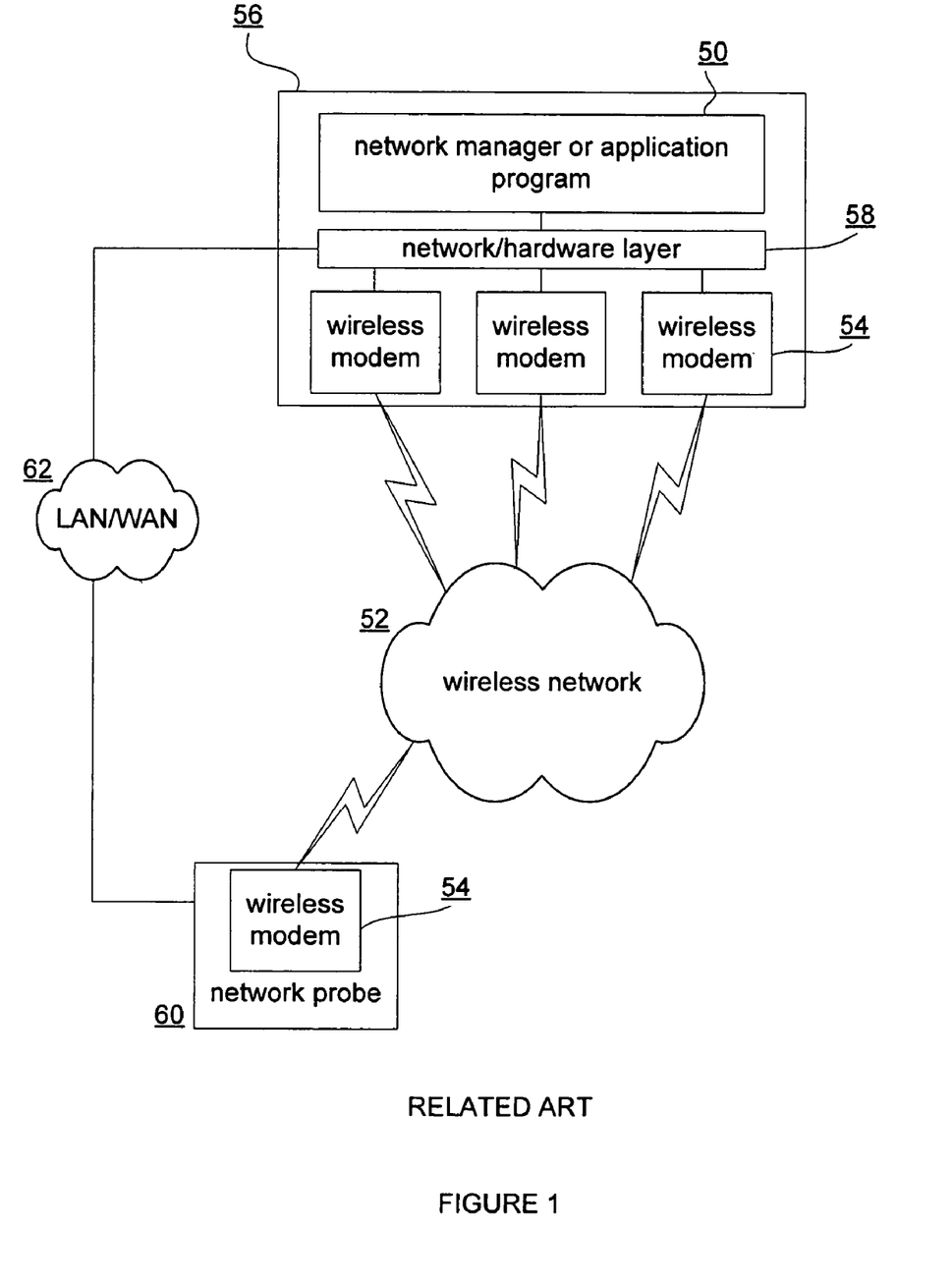
FIG. 1 shows a network management configuration in the related art.

FIG. 1 shows a network management configuration in the related art. A network manager program 50 is used to manage wireless network 52. An example of a network manager program 50 is the OSS Wireless QoS Manager, provided by Agilent Technologies. The wireless network 52 may be a cell-type network. One function of the network manager 50 may be to test the quality of service for wireless network 52. To do so, the network manager 50 uses one or more wireless modems 54 to obtain or derive information about the wireless network 52. An example of a wireless modem 54 is the MC35 Module.

A given wireless modem 54 implements an attention command set, which may be standardized, proprietary, or a mixture of both. Examples of attention command sets are IS707.3, GSM 07.07, ITU-T v25, etc. Attention commands, commonly referred to as "AT" commands, are the interface that applications use to access and control a wireless modem 54. Attention commands are usually in the form of ASCII strings. When a wireless modem 54 receives a command string, the wireless modem 54 may take some action or return some value according to the command. When the action is finished, the wireless modem 54 returns a response to the network manager 50. Responses are also usually in the form of an ASCII string. The makeup of a response to any given command may depend on the state of the wireless network 52, the state of the wireless modem 54, and other factors.

Referring again to FIG. 1, in a typical configuration, the network manager 50 is hosted on a server 56, such as a UNIX server or a Windows server. The wireless modems 54 are available through a network or device layer 58. In other words, the network manager 50 (or other network application) may access the wireless modems 54 through the server's 56 operating system as network or peripheral devices. A wireless modem 54 in a network probe 60 (available from Agilent Technologies) may also be accessed through a LAN or WAN 60.

Figure 2:
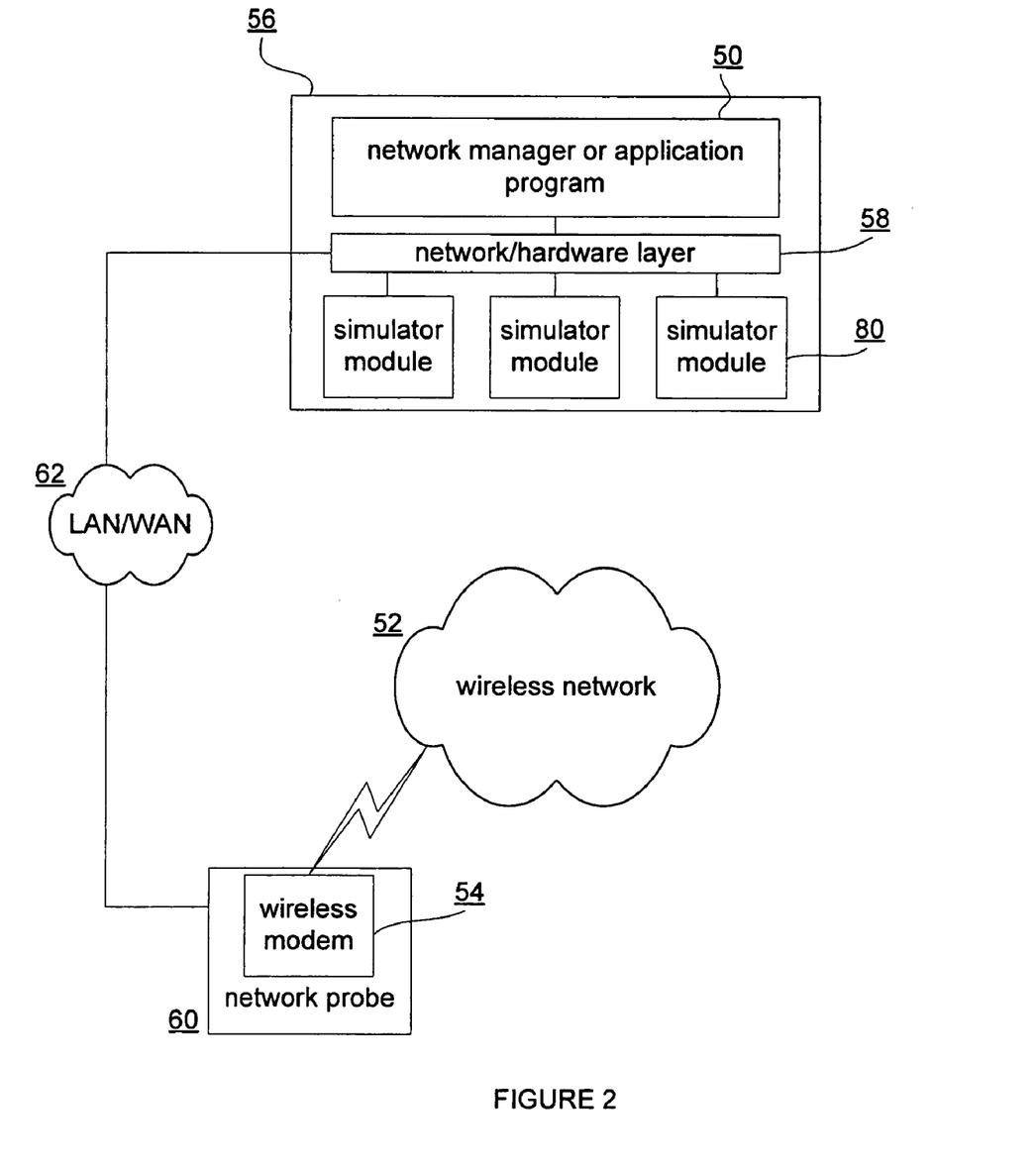
FIG. 2 shows an exemplary setting for using a wireless module simulator.

FIG. 2 shows an exemplary setting for using a wireless simulator 80. In the configuration of FIG. 2, wireless modems 54 are replaced by one or more wireless simulator modules 80. Preferably, dependencies on the particularities of a specific wireless network 52 may be avoided or minimized by abstracting the wireless network 52 at the wireless modem interface layer (e.g. the attention command application layer).

Provision of the wireless simulator 80 makes possible local testing and development of the network manager program 50 or other network application programs. Although a network manager program 50 is discussed herein, any application designed or intended to interact with a wireless modem 54 may be more efficiently tested and/or developed using a simulator module 80 in place of a wireless modem 54. The application should note be aware of the difference or require alteration. Although FIG. 2 shows each wireless modem 54 of server 56 having been replaced by a simulator module 80, some wireless modems 54 may be retained and used together with one or more simulator modules 80.

Figure 3:
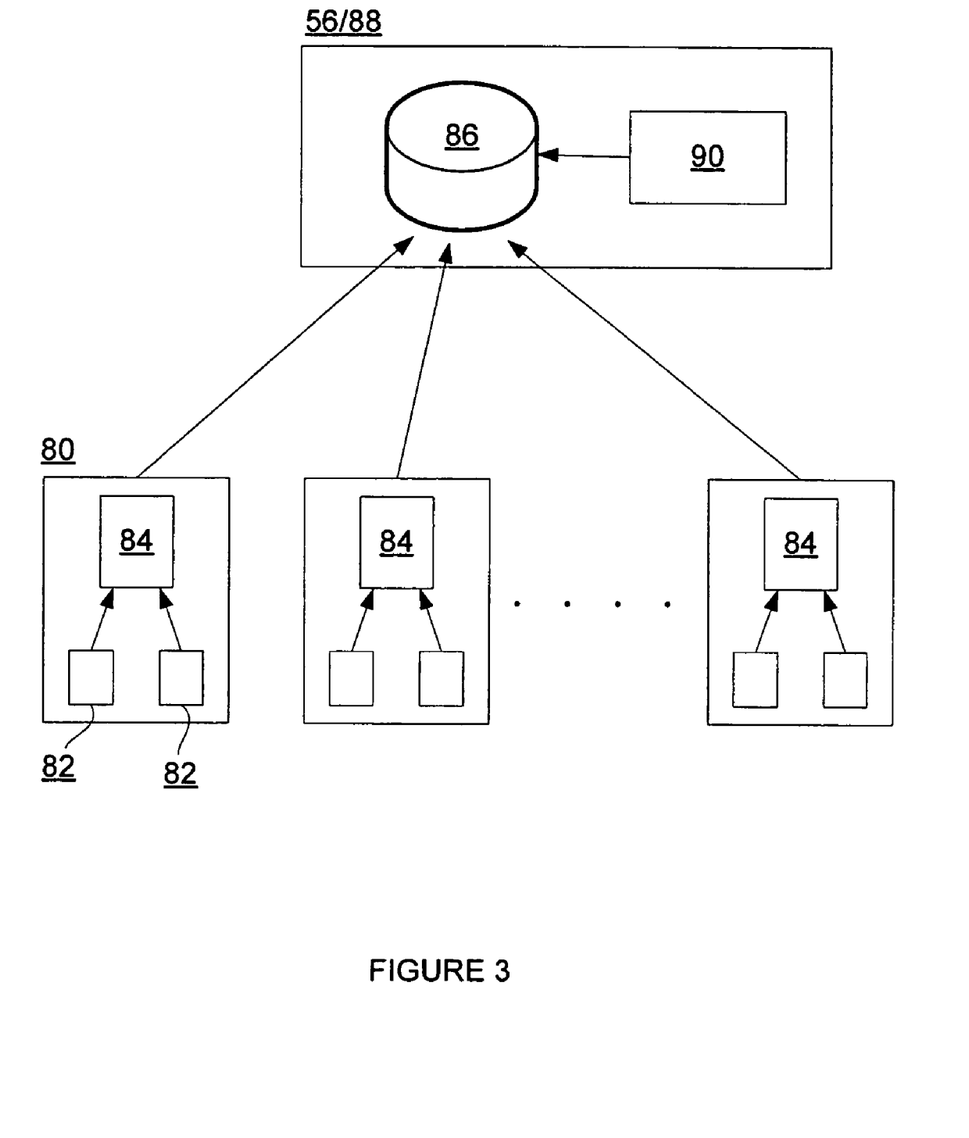
FIG. 3 shows one arrangement for providing wireless modem simulator modules.

FIG. 3 shows one arrangement for providing wireless modem simulator modules 80. In FIG. 3, one or more simulator modules 80 may be provided with one, two, or more attention command files 82. In one embodiment, the logic and communication function of a simulator module 80 is realized with a simulator program 84. A programmer implementing simulator program 84, discussed in greater detail below, may find it convenient to use the PERL programming language. However, any programming language or tool preferably with facilities for network or device level communication will suffice.

In one embodiment, the emulator or simulator program 84 is made available as a UNIX pseudo-tty device. Applications such as network manager 50 establish a network connection as if interacting with or connecting with a wireless modem 54. Interactions with the simulator program 84 are conveyed through this network connection, which may be the host's 56/88 local network interface or which may be a virtual IP address on the local interface. In this manner, applications designed for using wireless modems and services may interact with the emulated modem (simulator module 80) through a pseudo-tty without any difference than when interacting with a hardware wireless modem 54. The simulator module 80 appears as a wireless modem 54 to any application that uses it.

For reasons discussed below, it can also be advantageous to provide a database 86, in which case the simulator program 84 should have facilities for communicating with the database or database server 86. Sophisticated database features should not be necessary, and an ordinary database such as MYSQL may be used for database 86. Furthermore, although a database 86 is convenient, other means may be used, for example, a state machine, a custom built server, etc. The database 86 may reside on the same server or host 56 on which one or more of the wireless modem simulators 80 are executing. The database 86 may also reside on another server 88 and may be accessed by the modem simulators 80 over a network.

FIG. 3 also shows a control program 90. The control program 90 allows high level manipulation of data in database 86, thereby allowing a programmer or tester to conveniently control, in real time, the response states of one or more wireless modem simulators 80. As discussed below, a simulator's 80 response state may correspond to or may be realized by the values of data and rows in the database 86. The control program 90 is a convenience and is not necessary for emulation of a wireless modem.

Figure 4:
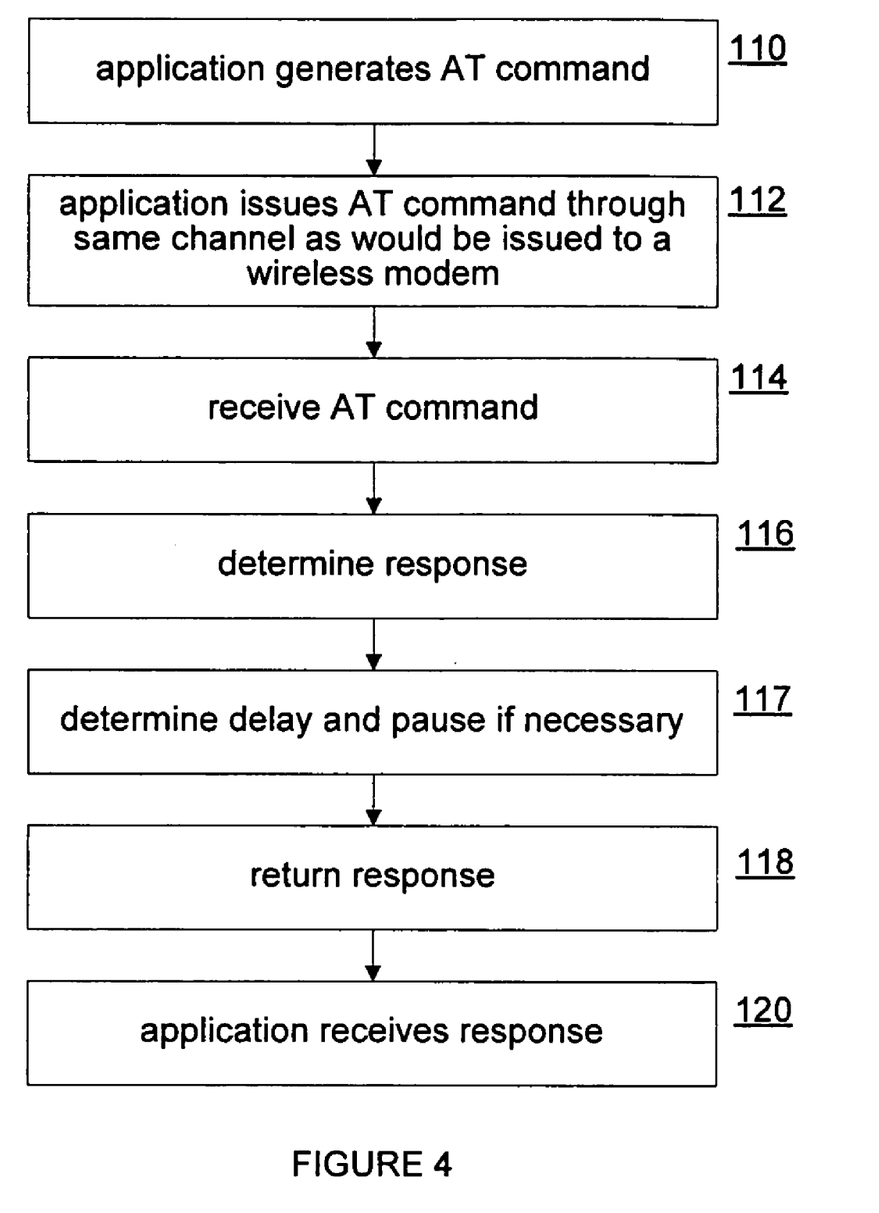
FIG. 4 shows an emulation process of a simulator module.

FIG. 4 shows an emulation process of simulator module 84. Initially, an application program such as network manager 50 generates 110 an attention command. The attention command is a string formatted according to the command set of the wireless modem 54 being simulated by the simulator module 84. Commands usually start with "AT", for "ATtention". Although the WQM mentioned above does not issue dial commands, if an application were to issue a Dial Command, the generated attention command string might be something like: ATD18005551212. Or, as another example if the application needs to set the type of incoming calls to be speech, the generated string might look something like: AT+CICB=2 (also not implemented by the particular WQM mentioned above). The format for any given command string will depend on the device or standard that is being emulated, and the set of commands to be issued may also vary depending on the application. An example of a command that might be issued by the WQM or network manager 50 is the COPS command. If the application or WQM/manager 50 needs to choose whether a GSM network operator is to be selected automatically, the generated attention command string might look something like: AT+COPS=0.

After generating 110 a command string, the application or network program issues 112 the generated command string through the same channel that would be used to issue commands to a wireless modem 54. For example, if a wireless modem is expected to the connected through an RS-232 connection, then the command generating application might communicate with a serial driver, a virtual IP address associated therewith, or the like. The generated attention command is passed through to the simulator module 80. The simulator module 80 receives 114 the command. The simulator module 80 selects or determines 116 an appropriate response string based on the received 114 command. For example, in responding to the AT command examples mentioned above, the simulator module 80 might select or determine 116 a string such as "OK". In response to a command like "AT+COPS=0 (a Write command query), the response might be "OK" or "+CME ERROR <err>".

After determining or selecting 116 a response string, the simulator module 80 determines 117 if there is a delay, if so, then the program pauses for the determined 117 length of time before returning 118 the determined 116 response string through the same communication path through which the command was received 114. This delay can improve the realism of the simulation. The application or network program receives 120 the returned 118 response transparently as if it was being received from a wireless modem 54. The application or network program such as network manager 50 proceeds accordingly.

The level of sophistication necessary for selecting or determining 116 a response string may vary according to the needs of the application. Therefore, it may be desirable to provide a variety of sources for potential response strings and a variety of algorithms for determining or selecting 116 therefrom. In one embodiment, a runtime parameter for simulation program 84 may control how a response is determined 116. For example, a user may choose a parameter indicating that responses are to be selected 116 randomly from among a set of predetermined responses associated with a particular command. Or, a user may choose a parameter indicating that responses of a same command are to be selected sequentially in round-robin style. Furthermore, emulation program 84 may be designed to respond to a default parameter by selecting 116 only predetermined default response strings for respective command strings.

Figure 5:
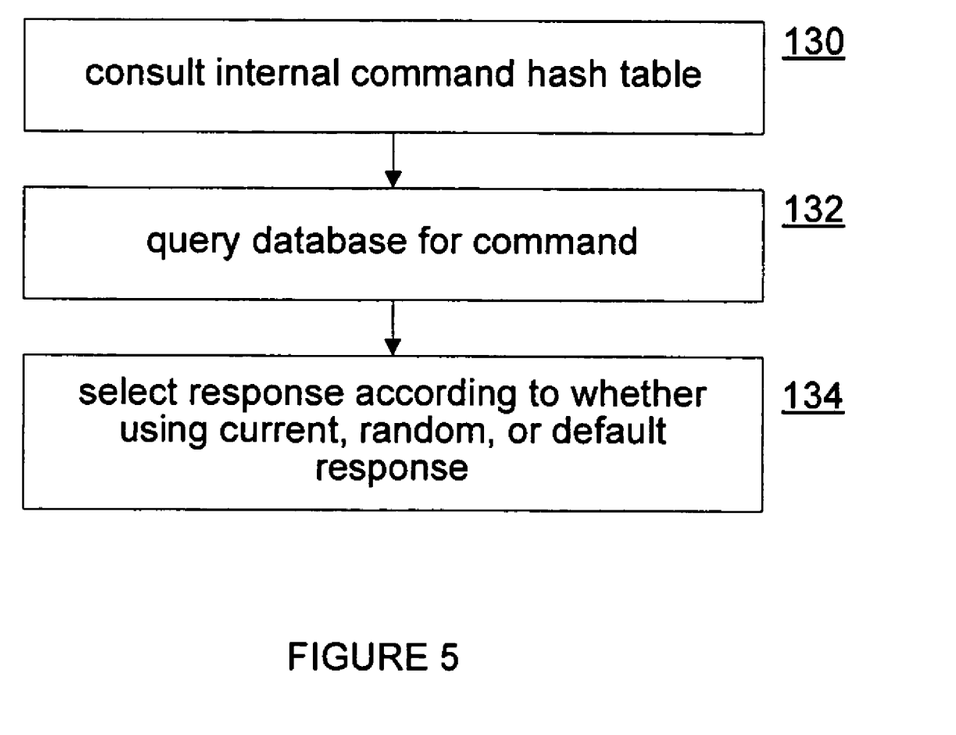
FIG. 5 shows a response source priority algorithm for a simulator module.

FIG. 5 shows a response source priority algorithm. In one embodiment, in determining 116 a response to an attention command string, simulation program 84 first consults 130 an internal command hash table. If the command string is not found in the hash table, then the simulation program 84 queries 132 the database 86 to obtain responses corresponding to the current command string. Then, response is selected 134 according to whether the current mode for obtaining responses is a random mode, a current mode, or a default mode. That is to say, from among the possible responses, a current, default, or random response may be selected 134.

Figure 6:
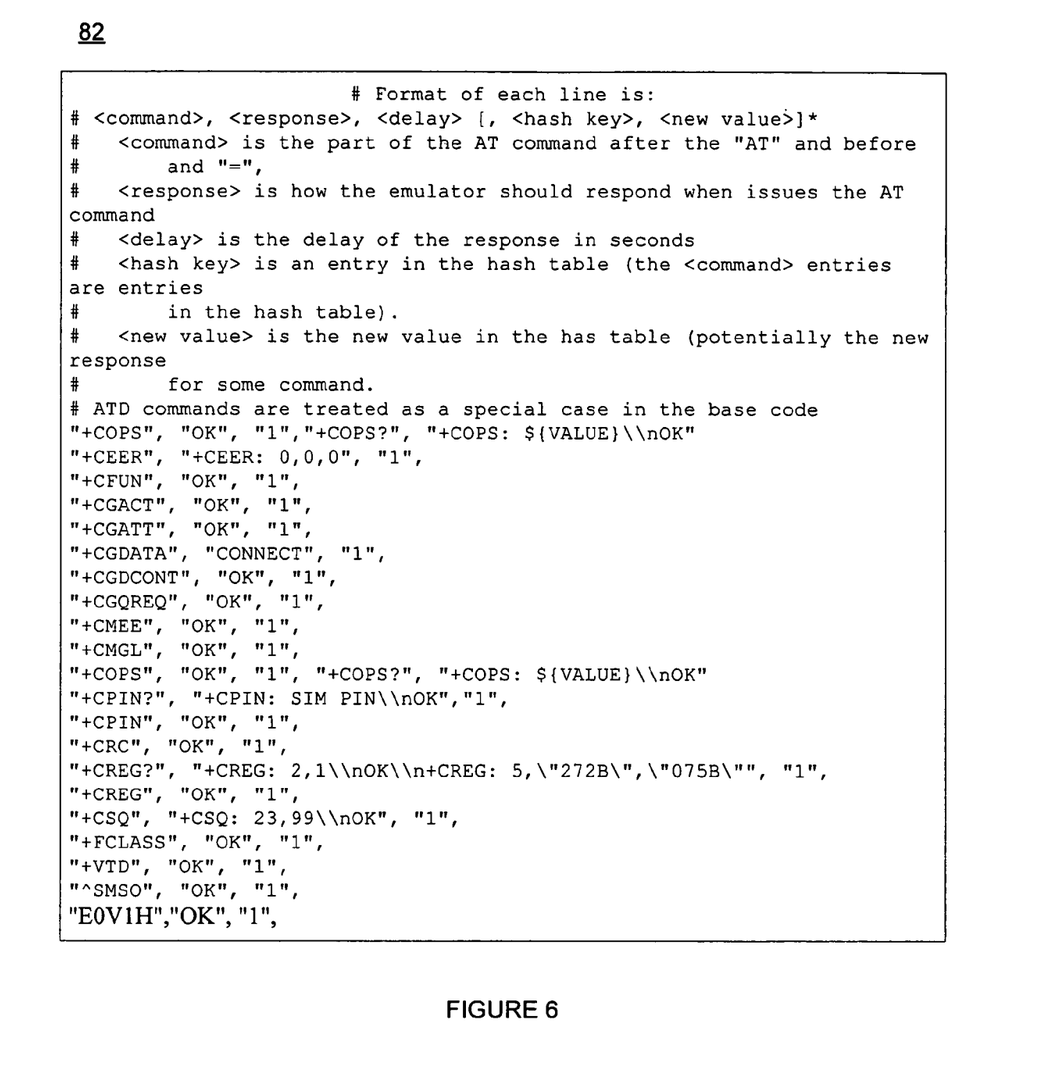
FIG. 6 shows an exemplary attention command file used to initiate a simulator program's hash table.

FIG. 6 shows an exemplary attention command file 82 used to initiate a simulator program's 84 hash table. The hash table mentioned above may, for example, be comprised of an associative array of lists (e.g. arrays, linked lists, etc.), each list corresponding to a command and each element of a list corresponding to a response for the respective command. The hash table keys or associative array keys may be the command strings.

The hash table may be loaded when the simulation program 84 is initiated. To do so, one or more attention command files 82 may be read by the simulation program 84 when it starts, where a second command file 82 may have a higher priority than a first command file 82. Alternatively, one or more responses may also be hardcoded. As mentioned, one attention command file 82 may have a higher precedent than another. For example, the simulation program 84, when starting, may look for and load a low priority first attention command file 82. The simulation program 84 may then look for a higher priority second attention command file 82, and its responses may be loaded to overwrite responses previously loaded from the first attention command file 82. This allows a tester or developer to use a base set of responses and to test permutations using temporary responses in the higher precedent attention command file 82.

It may be noticed in FIG. 6 that there is provision for entering a delay parameter for one or more response entries. Because a real wireless modem 54 usually has some significant delay when responding to commands (on the order of seconds), the simulation may be made more realistic by programming the simulation program 84 to pause or delay before returning 118 a response. Of course, the length of a delay might also being random, conditionally determined, etc. As discussed below, a delay may also be provided through database 86, preferably in association with a particular response.

Figure 7:
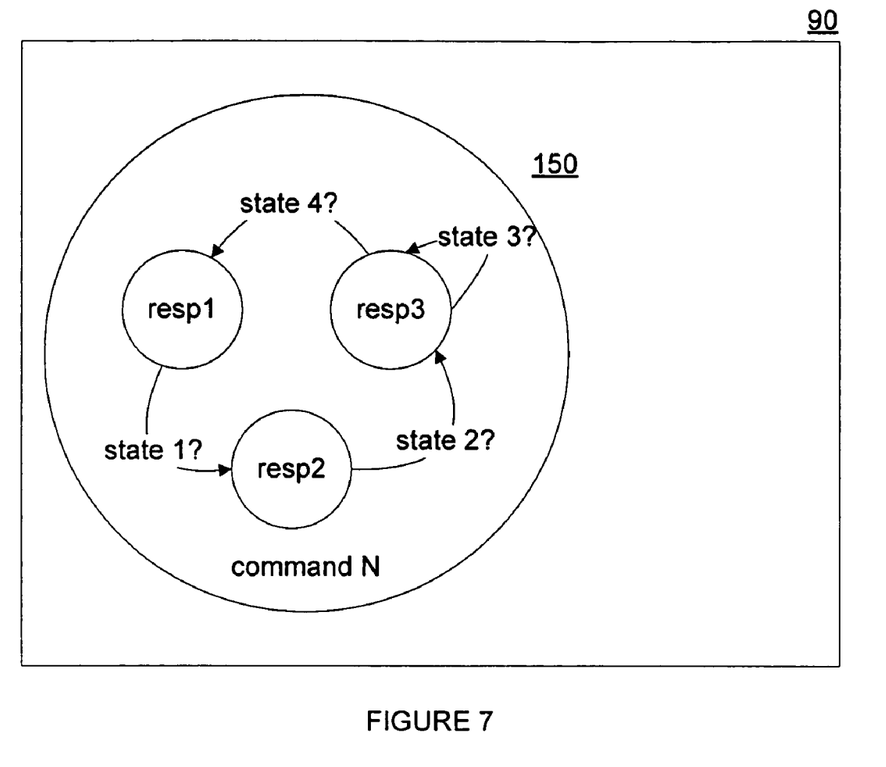
FIG. 7 shows a state diagram for selecting or determining responses for an emulated command.

FIG. 7 shows a state diagram for selecting or determining responses for an emulated command. A more sophisticated simulation of a wireless modem 54 may entail implementation of a state machine. The control program 90 may use the database 86 to both maintain the state of a particular command, in particular the responses available for the command and the current state or response for the command. The precise states and transitions of a state machine 150 for any given command may reflect the expected behavior of the wireless modem 54 that is being emulated. Furthermore, the state may actually be controlled in close coordination with the application program, thereby allowing deterministic testing of particular aspects of the application's network service functionality.

Figure 8:
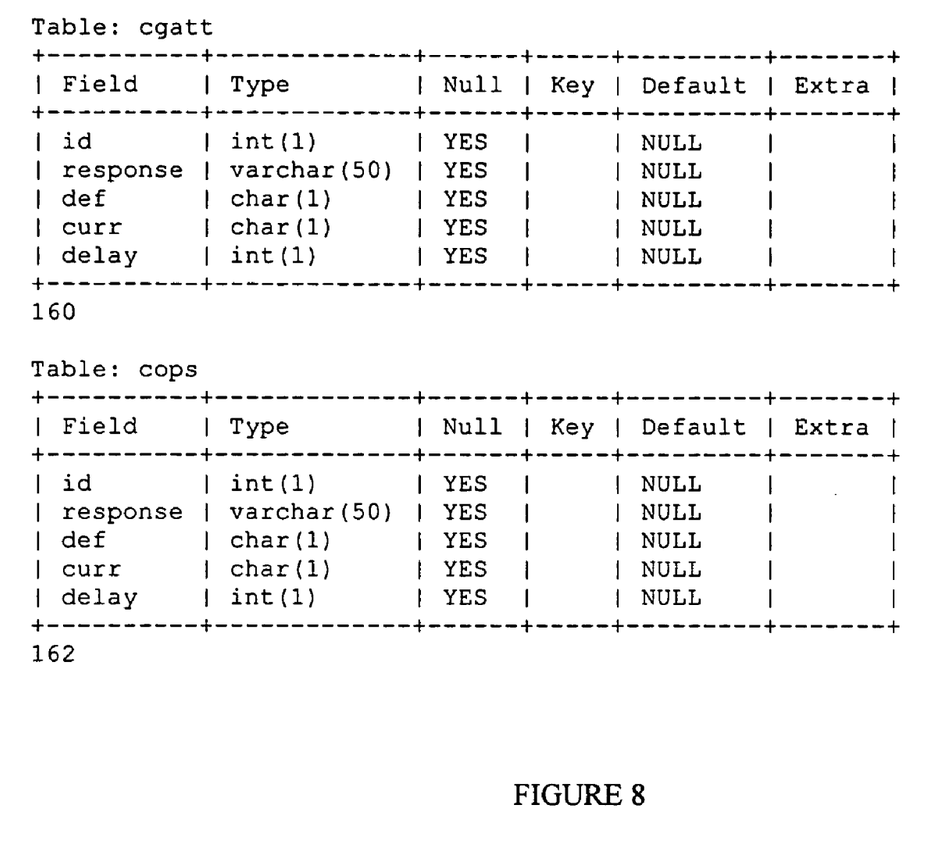
FIG. 8 shows examples of table formats 160 and 162 for respective simulated commands.

FIG. 8 shows examples of table formats 160 and 162 for respective simulated commands. As mentioned above, more flexible control of responses may be accomplished using database 86. One or more simulated commands may each have a corresponding table. Each row in a command's table will represent a response for the command. For example, in FIG. 8, the "cgatt" command and the "cops" command each have their own table.

The "id" column may be used as an index for random response selection from a table. The "def" column should be a Boolean type column; one row, the current row, will be flagged "Yes", and the rest of the rows will be flagged "No". This way, when the simulation program 84 is in a mode of seeking a predetermined default response, the database 86 may be queried for a default response for a command (the row with "def"="Yes"). The "response" column contains one of the response strings returned as a response for the table's command. That is, each row may have a different response string. The "delay" column, as discussed above, can be used to set a response delay time for pausing the simulator module 80 before returning the row's response.

The "curr" column can be used for maintaining a state for the command represented by the table. For example, the state may simply cycle through from one row/response to the next, returning to the first when the last has been used as a response. Cycling can be performed by the control program 90 iterating through the rows making one row at a time the row with "Yes" for its "curr" field. The change may be done at regular or random intervals or responsive to other information. Because the current response can change independently of the simulation program(s) 84, the returned response of a command can in effect be random or pseudo-random relative to a simulation program 84, particularly if more than one simulator modules 80 use the same table. However, if the sequential changing of the current response is synchronized or coordinated with the application, or if one simulator module 80 is using the table, then a particular deterministic sequence can be tested. Furthermore, a tester or developer may choose the response strings in a table to be the responses desirable for a particular condition to be tested and their sequence can be predetermined. In another embodiment, the control program 90 may determine the next state based on other factors such as the expected behavior of the respective command as implemented by the wireless modem 54 that is being simulated, an assumed wireless network condition, and so on.

The above-described embodiments allow a wireless network application such as a network manager to execute, as during development and testing of the same, as if connected to a wireless network using wireless modems without requiring physical access to or the presence of a wireless network or devices for accessing the same. The simulation of commands for a type of wireless device with a predefined attention command set (such as a wireless modem) may entail receiving, at a wireless device simulator, attention commands of the attention command set. For received attention commands, responses may be automatically determined or selected in response to receiving the command without using a wireless device to determine the appropriate response. And, the determined attention command responses may be provided from the wireless device simulator. Furthermore, an apparatus for simulating commands for a type of wireless device networkable with a wireless network and having a predefined attention command set may involve a network application device configured to access a wireless network by issuing attention commands of the attention command set. A simulator program coupled with the network device with a network program may be designed for receiving attention commands of the attention command set from the network testing device and may automatically determine appropriate responses for the attention commands without using a wireless device to determine the appropriate responses. And, the network program may receive the determined attention command responses from the simulator program.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of simulating commands for a type of wireless communication device with a predefined attention command set, the method comprising:

receiving at a wireless communication device simulator attention commands of the attention command set;

for received attention commands, automatically selecting or determining an appropriate response to a command without using a wireless communication device to determine or select the appropriate response;

providing the determined attention command responses from the wireless communication device simulator; and issuing from a network manager or network application the attention commands received by the wireless communication device simulator and the network manager or network application receiving the attention command responses issued by the wireless communication device simulator, further comprising dynamically controlling and changing a simulated state for the device simulator such that a response for a given command is determined or selected from among possible responses for the given command according to a current state of the simulated state.

2. A method according to claim 1, wherein the current state of the simulated state is determined randomly, pseudo-randomly, be default, or sequentially.

3. A method according to claim 1, wherein the current state is determined using a database storing responses for commands and the responses or state parameters thereof can be changed during a simulation.

4. A method according to claim 1, wherein potential responses for a command are given precedence relative to each other.

5. A method according to claim 1, further comprising controlling a timing or delay for the providing of some or all of the attention command responses.

6. A volatile or non-volatile computer-readable storage storing information for a computer to perform a method according to claim 1.

7. A method of simulating commands for a type of wireless communication device with a predefined attention command set, the method comprising:
  receiving at a wireless communication device simulator attention commands of the attention command set;
  for received attention commands, automatically selecting or determining an appropriate response to a command without using a wireless communication device to determine or select the appropriate response;
  providing the determined attention command responses from the wireless communication device simulator; and
  issuing from a network manager or network application the attention commands received by the wireless communication device simulator and the network manager or network application receiving the attention command responses issued by the wireless communication device simulator, wherein the network manager or network application couples with and communicates with the wireless communication device simulator in a same manner that the network manager or network application couples with and communicates with a wireless communication device being simulated by the wireless simulator, whereby the simulator fills the role of the wireless communication device transparently to the network manager or network application.

8. A method according to claim 7, wherein the wireless communication device being simulated comprises a wireless modem and wherein the predetermined attention command set comprises attention commands for operating and controlling the simulated wireless modem.

9. A volatile or non-volatile computer-readable storage storing information for a computer to perform a method according to claim 7.

10. A method according to claim 7, wherein the wireless communication device being simulated comprises a wireless modem and the wireless network networkable therewith comprises a cell network, and wherein the predetermined attention command set comprises attention commands for operating and controlling the simulated wireless modem.

11. An apparatus for simulating commands for a type of wireless communication device networkable with a wireless network and having a predefined attention command set, the apparatus comprising:
  a network device with a wireless network application configured to access and use the wireless network by issuing attention commands of the attention command set;
  a simulator program in communication with the wireless network application, receiving attention commands of the attention command set from the wireless network application, and automatically selecting or determining appropriate responses for the attention commands without using a wireless communication device to select or determine the appropriate responses; and
  the wireless network application receiving the selected or determined attention command responses from the simulator program, wherein the wireless communication device being simulated comprises a wireless modem, wherein the wireless network networkable with the wireless modem comprises a cell network, and wherein the attention command set comprises attention commands for operating and controlling the simulated wireless modem, further comprising dynamically controlling and changing a simulated state for the device simulator such that a response for a given command is determined or selected from among possible responses for the given command according to a current state of the simulated state.

12. An apparatus according to claim 11, wherein the current state of the simulated state is determined randomly or pseudo-randomly.

13. An apparatus according to claim 11, wherein the current state is determined using a database storing responses for commands and the responses or parameters thereof can be changed during a simulation.

14. An apparatus according to claim 11, wherein responses for a command are given precedence relative to each other and are selected or determined accordingly.

15. An apparatus according to claim 11, wherein the networking testing device couples with and communicates with the simulator program in a same manner that the networking testing device couples with and communicates with a wireless communication device being simulated by the simulator program.

16. An apparatus according to claim 11, wherein a timing or delay for the providing of some or all of the attention command responses is controllably variable.

* * * * *